July 15, 1930.                M. W. MORGAN                1,770,743
                         FLEXIBLE SHAFT COUPLING
                           Filed May 10, 1926
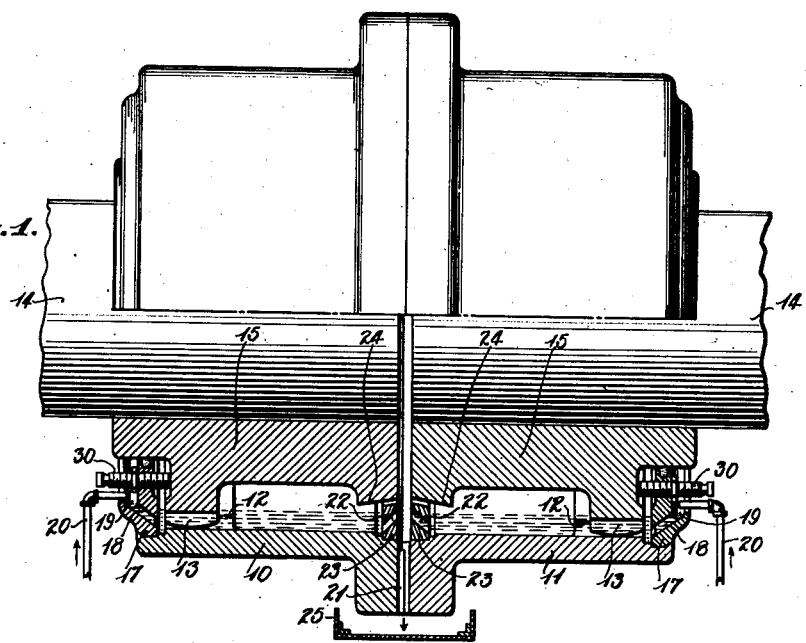
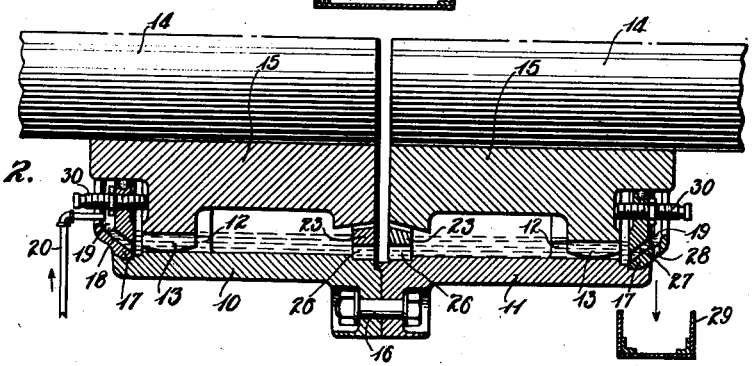
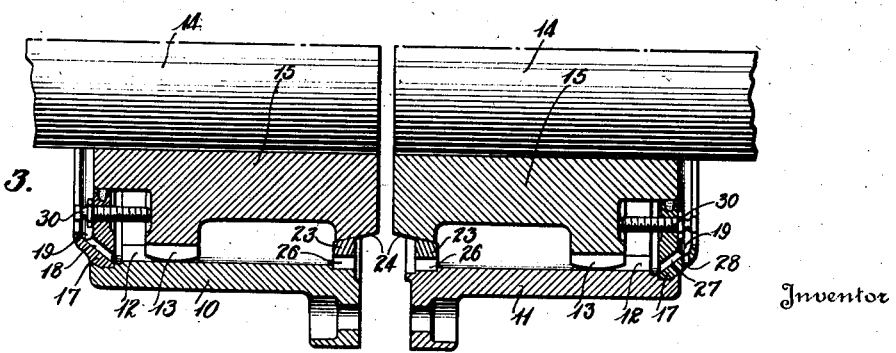
Inventor
Merton W. Morgan
By Church & Church
His Attorney Patented July 15, 1930

1,770,743

UNITED STATES PATENT OFFICE

MERTON W. MORGAN, OF BALTIMORE, MARYLAND, ASSIGNOR TO POOLE ENGINEERING AND MACHINE COMPANY, OF BALTIMORE, MARYLAND, A CORPORATION OF MARYLAND

FLEXIBLE SHAFT COUPLING

Application filed May 10, 1926. Serial No. 108,121.

This invention relates to improvements in flexible shaft couplings.

In flexible shaft couplings now quite commonly found on the market each shaft end is provided with a hub having teeth which are adapted to intermesh with teeth on a sleeve, whereby rotary motion may be transmitted from one of the shafts to the other. Usually this sleeve has a rocking bearing on the teeth of the shaft hubs and said sleeve is composed of two sections which are bolted together when in use but which may be detached from one another to permit application to or removal from the shaft hubs. In some of the prior structures, means have been provided for lubricating the intermeshing teeth on the sleeve sections and shaft hubs. In most instances a desired quantity of lubricant is deposited within the sleeve, escape of such lubricant being prevented by radially disposed flanges at the sleeve ends, but in these arrangements there is no means of indicating when the oil within the sleeve has been depleted, under which circumstances the coupling would continue to run dry. One object, therefore, of the present invention, is to provide a lubricant circulating system for maintaining a continuous flow of oil through the connecting sleeve, this circulation of oil being accomplished in such fashion that the fresh oil supplied into the interior of the sleeve will be directed into intimate contact with the teeth and the oil discharged from the sleeve will be drawn off from that portion of the film of oil wherein is located grit or other particles of foreign matter, the comparatively clean oil temporarily remaining within the sleeve. This result is obtainable by reason of the fact that when the coupling is in operation centrifugal force causes foreign matter in the film of oil to move radially outward against the inner surface of the connecting sleeve and by drawing the oil off at this point, such foreign matter can be removed leaving, as has been said, the comparatively clean oil in the sleeve.

It not infrequently occurs that the connecting sleeve sections and the hubs for the shafts are produced and shipped to a point where they are to be applied to shafts and it is, therefore, desirable that means be provided for rigidly securing the sleeves and hubs together to prevent injury during shipment. A further object of the invention is, therefore, to provide means for locking the separated sleeve sections to their respective hub members in such fashion that they can be shipped without danger of being injured, but in a way whereby the hubs and sleeve sections can be readily applied to the shafts and the sections connected together, under which circumstances the sleeve sections are then free to rock on the bearings afforded them by the teeth on the hubs.

With these and other objects in view the invention consists in certain novel details of construction and combinations and arrangements of parts, all as will hereinafter be more fully described and the novel features thereof particularly pointed out in the appended claims.

In the accompanying drawings,—

Figure 1 is an illustration of a shaft coupling, partly in elevation and partly in section, wherein is embodied the present improvements.

Fig. 2 is a somewhat similar view illustrating a modified arrangement for securing a continuous circulation of lubricant through the coupling.

Fig. 3 is a similar view illustrating the sleeve sections locked on their respective hubs.

The coupling shown in the present instance for the purpose of illustrating the present invention is quite similar to the coupling shown and described in applicant's prior Patent No. 1,535,621, dated April 28, 1925, such coupling comprising the connecting sleeve composed of sections 10, 11, provided with teeth 12 on its interior, the surfaces between these teeth 12 taking a rocking bearing on the teeth 13 carried by the shafts 14 which are adapted to be connected together by the coupling. Preferably, as is usual, these teeth 13 which, in conjunction with the teeth 12, transmit motion from one shaft to the other, are formed on hubs 15 fixed in any suitable manner on the shaft ends 14. To operatively connect the shafts together the sleeve sections 10, 11 are placed in the position shown in Figs. 1 and 2 and secured to each other by means of bolts 16 extending through outwardly directed flanges at the proximate ends of said sections. A further detail description of the coupling is believed to be unnecessary so far as the present invention is concerned.

For circulating a lubricant, usually an oil, through the sleeve the remote ends of the sleeves are provided with oiling rings 17 in each of which there is a circular series of radially disposed ducts 18 extending from a groove 19 in the ring to a point substantially in line with the bases of the teeth 12 and the crowns of the teeth 13. Communicating with these oil grooves 19 in the rings are oil supply connections 20 and oil deposited in said grooves will be delivered under pressure created by centrifugal force during rotation of the coupling directly to the intermeshing teeth 12, 13, thereby insuring a continuous fresh supply of lubricant at the very point where it is most essential. Centrifugal force will maintain a film of oil around the entire inner surface of the sleeve sections 10, 11, the thickness of this film depending upon the location of the outlet through which the oil escapes from the sleeve. It will be apparent that foreign matter in the oil, being heavier than the oil, will be forced outwardly against the inner surface of the sleeve and in order to insure this portion of the oil being drawn off, the outlet for the oil in the present instance is preferably arranged as shown in Figure 1. In this construction said outlet consists of a series of radial holes 21 formed in the abutting faces of the external flanges on the sleeve sections, these holes communicating at their inner ends with ducts 22 so arranged that the oil located against the surface of the sleeve must necessarily flow therethrough while the oil forming the inner portion of the film within the sleeve will remain temporarily within the sleeve. By causing the oil to flow through these radially disposed ducts 22 before it can escape through the outlet holes 21 it will be apparent that a film of oil must necessarily build up within the sleeve as well as within said ducts 22 until it reaches a height sufficient to flow over the ledge, so to speak, formed at the discharge ends (the radial inner ends) of the discharge ducts. In the present instance these ducts 22 are formed in the alining rings 23 carried by the sleeve sections and adapted to cooperate with alining surfaces 24 on the hub, this alining feature being fully disclosed in applicant's prior patent before referred to. It will be understood, however, that the present invention is not to be limited to this particular location or formation of the ducts 22 in such alining rings. Oil discharged through the outlet holes 21 may be collected in a trough 25.

In the construction shown in Fig. 2 the oil is adapted to be supplied at one end of the sleeve and discharged at the opposite end. In this construction oil from the supply pipe 20 is deposited in the groove 19 of the oiling ring 17 and flows through the inlet holes 18 extending radially outward from said groove 19 to a point in line with the teeth 12, 13. Instead of being discharged from the sleeve at the abutting ends of the sleeve sections the oil is adapted to flow through ducts 26 in the alining rings 23 to the opposite end of the sleeve where it then flows through outlet holes 27 in the oiling ring 17, these holes 27 leading to the groove 19 in the bottom of which there is provided a series of discharge openings 28, the inner ends of these discharge openings 28 being spaced from the center of rotation of the sleeve a distance greater than the inner ends of the inlet openings 18 in order that the point of discharge will be located below, so to speak, the point at which the oil is fed into the sleeve. Oil discharged through said openings 18 is deposited in a collecting trough 29.

In both of these circulating systems it will be seen that centrifugal force causes the oil to be delivered under pressure directly to the point where it is most essential, i. e., where the sleeve sections take their bearings on the crowns of the hub teeth 13. In addition, both arrangements insure the retention of comparatively clean oil within the sleeve while permitting that portion of the oil containing foreign matter to escape through the discharge openings. In other words, the oil is drawn off at a point where the foreign matter is collected in the oil due to the centrifugal force generated by the operation of the apparatus.

In Fig. 3, the sleeve sections 10, 11 are shown in the positions they occupy when the shafts are disconnected, it sometimes being desirable to disconnect the shafts in order that the driven shaft may remain stationary while the driving shaft continues to rotate. Under these circumstances it is highly desirable that the sleeve section carried by the driving shaft be firmly secured thereon so as to prevent vibrations being set up therein, such as would occur if said section should be loose on the shaft end. While it is possible to lock the sleeve section firmly on the shaft in various ways it is preferred, for the sake of economy, that this result be obtained through the use of the cooperating locking surfaces on said parts because, if accomplished in this way, it is possible to utilize the alining members of the structure in securing this result. For instance, as shown in Fig. 3, the alining surfaces 24 on the hubs 23 may be tapered or of frusto-conical formation and by moving the sleeve sections away from each other longitudinally of the shafts these cooperating alining surfaces may be brought into engagement with each other so as to securely lock the sleeve sections on the shaft hubs with substantially a wedging action. To facilitate this longitudinal displacement of the sleeve sections there may be provided jack screws 30 extending through the oiling rings 17 and with their inner ends engaging against the abutment formed by that portion of the hub on which are located the driving teeth 13. As will be understood by turning the jack screws 30 in the proper direction the sleeve sections can be moved relatively to the hubs until the oppositely tapered surfaces 23, 24 are brought together and the sleeve sections firmly locked on the hubs. This arrangement is not only useful where it is desired to rotate only the driving shaft but, as before pointed out, where the manufacturer makes and ships the hub and sleeve section alone he can firmly lock said parts together as a preventative of their being injured while in transit.

What I claim is:

1. In a flexible shaft coupling, a hub member adapted to be secured to a shaft, a connecting sleeve section on said hub, intermeshing teeth on said hub and sleeve section, cooperating wedging surfaces on said hub and sleeve section, and means carried by said sleeve section and engageable with said hub for moving the sleeve section longitudinally of the shaft and forcing said wedging surfaces together.

2. In a flexible coupling, a shaft provided with a hub and a tapered surface, a sleeve provided with a reversely tapered surface and having a rocking bearing on said shaft, and means carried by said sleeve section and engageable with the hub for moving said sleeve section longitudinally of the shaft and wedging said tapered surfaces together to prevent rocking of said sleeve on the shaft.

3. In a flexible coupling, a shaft, a hub on said shaft, a sleeve on said hub, intermeshing teeth on the hub and sleeve, said sleeve being adapted to rock on said hub teeth, oppositely disposed conical surfaces on said hub and sleeve, and means carried by said sleeve section and engageable with the hub for moving said sleeve section longitudinally of the shaft and wedging said conical surfaces together to prevent said sleeve rocking on said hub.

4. In a flexible coupling, a shaft, a hub on said shaft, a sleeve on said hub, intermeshing teeth on the hub and sleeve, said sleeve being adapted to rock on said hub teeth, oppositely disposed conical surfaces on said hub and sleeve, a fixed abutment on said hub, and a screw carried by said sleeve and engaging said abutment for moving said conical surfaces into wedging engagement.

MERTON W. MORGAN.